United States Patent
Kanazawa

(10) Patent No.: US 12,482,078 B2
(45) Date of Patent: Nov. 25, 2025

(54) MACHINE LEARNING FOR HIGH QUALITY IMAGE PROCESSING

(71) Applicant: Google LLC, Mountain View, CA (US)

(72) Inventor: Noritsugu Kanazawa, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 400 days.

(21) Appl. No.: 18/013,802

(22) PCT Filed: Jun. 29, 2020

(86) PCT No.: PCT/US2020/040104
§ 371 (c)(1),
(2) Date: Dec. 29, 2022

(87) PCT Pub. No.: WO2022/005448
PCT Pub. Date: Jan. 6, 2022

(65) Prior Publication Data
US 2023/0360181 A1    Nov. 9, 2023

(51) Int. Cl.
*G06T 5/77* (2024.01)
(52) U.S. Cl.
CPC ...... *G06T 5/77* (2024.01); *G06T 2207/20081* (2013.01); *G06T 2207/20084* (2013.01)
(58) Field of Classification Search
None
See application file for complete search history.

(56) References Cited

U.S. PATENT DOCUMENTS

| | | | |
|---|---|---|---|
| 11,508,042 B1* | 11/2022 | Knuffman | G06T 7/579 |
| 11,537,134 B1* | 12/2022 | Wiest | G06N 3/0455 |
| 2019/0251723 A1* | 8/2019 | Coppersmith, III | G06N 3/045 |
| 2020/0104640 A1* | 4/2020 | Poole | G06N 3/047 |
| 2021/0287352 A1* | 9/2021 | Calderon | G06V 10/772 |
| 2021/0343080 A1* | 11/2021 | Kim | G06N 3/084 |
| 2022/0277491 A1* | 9/2022 | Lee | G06T 9/002 |

(Continued)

FOREIGN PATENT DOCUMENTS

WO    WO2018102717    *   6/2018   ............ G06T 7/269

OTHER PUBLICATIONS

Oleg et al ("Variational Autoencoder with Arbitrary Conditioning", arXiv.org preprint arXiv:1806.02382 (2019), pp. 1-25) (Year: 2019).*

(Continued)

*Primary Examiner* — Leon Viet Q Nguyen
(74) *Attorney, Agent, or Firm* — DORITY & MANNING P.A.

(57) ABSTRACT

A system or method for inpainting can be aided through the use of machine learning and ground truth data training. The training of machine-learning inpainting models through the use of ground truth image data may add efficiency and precision to the field of image inpainting. Furthermore, machine-learning inpainting models can aid in the non-deterministic prediction of a variety of data types and can be applicable to the removing and/or replacing of a variety of data types. The trained models can be enabled to make predictions without ground truth reassurance due to calibrated parameters tuned through the training.

18 Claims, 8 Drawing Sheets

(56) References Cited

U.S. PATENT DOCUMENTS

2023/0267330 A1    8/2023   Sandler et al.

OTHER PUBLICATIONS

International Preliminary Report on Patentability for Application No. PCT/US2020/040104, mailed Jan. 12, 2023, 9 pages.
Machine Translated Chinese Search Report Corresponding to Application No. 2020801020275 on Jun. 21, 2024.
Du et al, "Conditional Variational Image Deraining", Transactions on Image Processing, vol. 29, 2020, pp. 6288-6301.
International Search Report for Application No. PCT/US2021/040104, mailed on Mar. 30, 2021, 2 pages.
Ivanov et al, "Variational Autoencoder with Arbitrary Conditioning", arXiv:1806.02382v3, Jun. 27, 2019, 26 pages.
Qin et al, "Automatic Semantic Content Removal by Learning to Neglect", arXiv:1807.07696v1, Jul. 20, 2018, 12 pages.
Zheng et al, "Pluralistic Image Completion", arXiv:1903.04227v2, Apr. 5, 2019, 22 pages.
Du et al., "Conditional Variational Image Deraining", arXiv:2004.11373v2, May 8, 2020, 14 pages.
Github, "JiahuiYu/generative_inpainting", https://github.com/JiahuiYu/generative_inpainting, retrieved on Mar. 14, 2023, 4 pages.
Goodfellow et al., "Generative Adversarial Networks", arXiv:1406.2661v1, Jun. 10, 2014, 9 pages.
Ham et al., "Variational Image Inpainting", Third Workshop on Bayesian Deep Learning, Conference on Neural Information Processing Systems, Montréal, Canada, Dec. 7, 2018, 6 pages.
Isola et al., "Image-to-Image Translation with Conditional Adversarial Nets", arXiv:1611.07004v3, Nov. 26, 2018, 17 pages.
Ivanov et al., "Variational Autoencoder with Arbitrary Conditioning", arXiv:1806.02382v3, Jun. 27, 2019, 25 pages.
Kingma et al., "Auto-Encoding Variational Bayes", arXiv:1312.6114v11, Dec. 10, 2022, 14 pages.
Nvidia, "Image Inpainting", 2018, https://www.nvidia.com/research/inpainting/index.html, retrieved on Mar. 14, 2023, 1 page.
Sohn et al., "Learning Structured Output Representation using Deep Conditional Generative Models", Twenty-eighth International Conference on Neural Information Processing Systems, vol. 2, Dec. 2015, 9 pages.
Walker et al., "An Uncertain Future: Forecasting from Static Images using Variational Autoencoders", arXiv:1606.07873v1, Jun. 25, 2016, 17 pages.
Zheng et al., "Pluralistic Image Completion", arXiv:1903.04227v2, Apr. 5, 2019, 21 pages.

\* cited by examiner

MACHINE LEARNING FOR HIGH QUALITY IMAGE PROCESSING

PRIORITY CLAIM

This application is based upon and claims the right of priority under 35 U.S.C. § 371 to International Application No. PCT/US2020/040104 filed on Jun. 29, 2020, which is incorporated by reference herein.

FIELD

The present disclosure relates generally to processing image data. More particularly, the present disclosure relates to a machine-learned model for high quality image inpainting that can be trained with the aid of ground truth data.

BACKGROUND

Images (e.g., photographs) and other forms of data often include unwanted data. As one example, the unwanted data could correspond to artefacts arising from processing an image to reduce noise in the image. As another example the unwanted data could correspond to a human person in the foreground of a landscape or an unknown person in the background of a family photo. As another example, the unwanted data could correspond to an unsightly object in an otherwise pristine background.

Thus, unwanted data can correspond to objects which occlude or obscure other portions of an image, such as a depicted scene. However, replacing the unwanted data with replacement data (e.g., replacement image data that depicts the occluded portion of the image that is occluded by the unwanted data, a process also known as "inpainting") is a challenging problem which is non-deterministic in nature. Stated differently, multiple possible solutions could be determined from the same image, resulting in a difficult problem.

SUMMARY

Aspects and advantages of embodiments of the present disclosure will be set forth in part in the following description, or can be learned from the description, or can be learned through practice of the embodiments.

The present disclosure provides systems and methods for replacing unwanted data with replacement data based on data characteristics and ground truth training techniques. A computing system in accordance with the disclosure can be configured to receive a given set of augmented data, a mask, and a set of ground truth data; encode the augmented data and mask; encode the ground truth data; compile the data received from both encodings; decode the encodings; compare output to ground truth data; and modify the system parameters. By using the ground truth encoding, the computing system may be further aided in the replacement of data. In this manner, implementations of the disclosure may be used to create replacement data in place of the unwanted data.

One example aspect of the present disclosure is directed to a computer implemented method of training a machine-learning image inpainting model. The method can include a conditional variational autoencoder. The method can include obtaining a training sample including ground truth image data, augmented image data derived from an addition of unwanted image data to the ground truth image data, and a mask that may indicate one or more locations of the unwanted image data within the augmented image data. The method can further include processing the augmented data and mask with a first encoder model of the conditional variational autoencoder to generate an embedding for the image data, and can include processing the ground truth image data and the mask with a second encoder model to generate one or more distribution values. Furthermore, the method can include processing the embedding and the one or more distribution values with a decoder model of the conditional variational autoencoder to generate predicted image data that may include replacement image data at the one or more locations indicated by the mask, wherein the replacement image data may replace the unwanted image data. Additionally, the method can include evaluating one or more loss functions based on a comparison of the predicted image data with the ground truth image data, then modifying one or more parameter values of the conditional variational autoencoder based at least in part on the one or more loss functions.

Another example aspect of the present disclosure is directed to a computing system, comprising at least one processor, a machine-learned image inpainting model, and at least one tangible, non-transitory computer-readable medium that stores instructions that, when executed by the at least one processor, may cause the at least one processor to perform operations. The system can include an encoder, wherein the encoder can be configured to encode image data, and a decoder, wherein the decoder can be configured to decode image data. The machine-learned image inpainting model can be trained to input image data and a mask into the encoder, wherein the image data can include unwanted image data, and wherein the mask can indicate a location and size of the unwanted image data. Moreover, the machine-learned image inpainting model can be trained to receive an embedding from the encoder, wherein the embedding can include the encoded image data. The machine-learned image inpainting model can be trained to input the embedding and a conditioning vector into the decoder. The machine-learned image inpainting model can be further trained to receive predicted image data as an output of the decoder, wherein the predicted image data can replace the unwanted image data with predicted replacement data based at least in part on the image data and the conditioning vector.

Another example aspect of the present disclosure is directed to one or more non-transitory computer-readable media. The media may collectively store instructions that cause one or more computing devices to perform operations. The operations can include a conditional variational autoencoder. The operations can include obtaining a training sample including ground truth data, augmented data derived from an addition of unwanted image data to the ground truth image data, and a mask that may indicate one or more locations of the unwanted data within the augmented data. The operations can further include processing the augmented data and mask with a first encoder model of the conditional variational autoencoder to generate an embedding for the data and can include processing the ground truth data and the mask with a second encoder model to generate one or more distribution values. Furthermore, the operations can include processing the embedding and the one or more distribution values with a decoder model of the conditional variational autoencoder to generate predicted data that may include replacement data at the one or more locations indicated by the mask, wherein the replacement image data can replace the unwanted data. Additionally, the operations can further include evaluating one or more loss functions based on a comparison of the predicted data with the ground truth data, then modifying one or more parameter values of the conditional variational autoencoder based at least in part on the one or more loss functions. The operations can further include evaluating one or more loss functions based on a comparison of the predicted image data with the ground truth data. Moreover, the operations can include modifying one or more parameter values of the conditional variational autoencoder based at least in part on the one or more loss functions.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
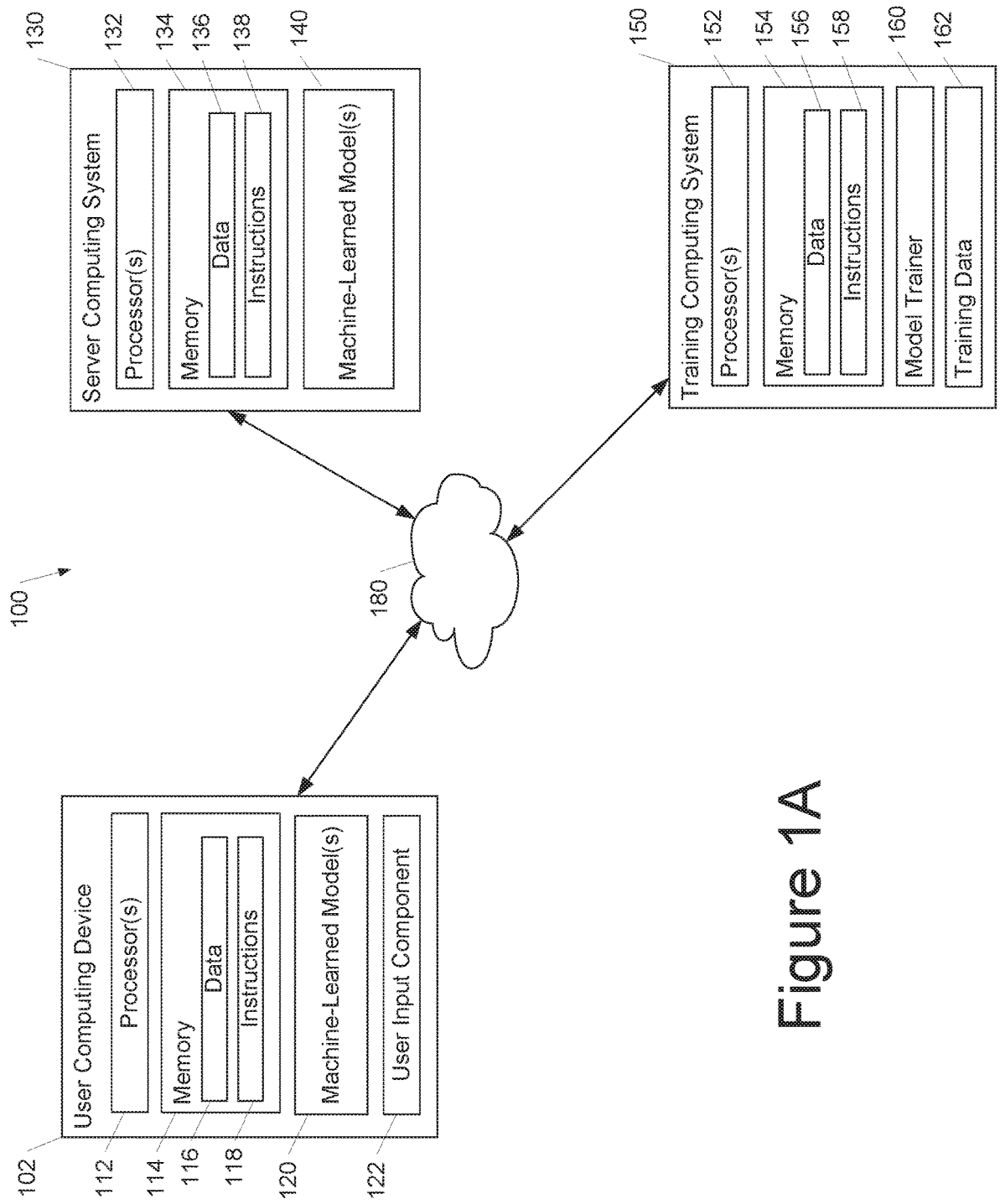
FIG. 1A depicts a block diagram of an example computing system according to example embodiments of the present disclosure.

Reference numerals that are repeated across plural figures are intended to identify the same features in various implementations.

DETAILED DESCRIPTION

Generally, the present disclosure is directed to systems and methods that use machine learning to perform inpainting, which can refer to the replacement of unwanted data with replacement data. As one example, in the context of image data, inpainting can include the removal of a human person or other undesired object from an image and the filling in of the image at the location of the removed data using replacement data. According to aspects of the present disclosure, the replacement data can be predicted by a machine-learned model such as, for example, a conditional variational autoencoder. The predicted replacement data can be based largely on the data that is not obstructed.

In particular, the proposed inpainting systems may utilize machine learning technology to better refine the predicted replacement data that may be inpainted into the image. Training of the machine learning model(s) can involve a ground truth image, an augmented image, and a mask. The ground truth image can be an image without unwanted data. The augmented image can be the ground truth image with a portion of the image being occluded by unwanted data (e.g., the unwanted data can be added to the ground truth image data to generate the augmented image data). The mask (e.g., a binary pixel mask) can indicate the location and/or size of the unwanted data within the augmented image data.

As one example, the proposed inpainting systems can utilize a machine-learned autoencoder model to perform the prediction of the replacement image data. The autoencoder model can be, for example, a conditional variational autoencoder. In some implementations, the autoencoder model can include an encoder model configured to encode input image data to generate encoded data and a decoder model configured to predict the replacement data based on the encoded data generated by the encoder.

In some implementations, training of the machine-learned model(s) can begin by generating the augmented image data from the ground truth image data (e.g., by adding unwanted data to the ground truth image data). A mask (e.g., a binary pixel mask) can indicate the location(s) of the unwanted data within the augmented image data.

Next, the augmented image can be input into the encoder with the mask to generate encoded data, which also may be referred to as an embedding, as an output of the encoder. In some implementations, during training, the ground truth image and mask is also encoded by using a second, different encoder. The encoded ground truth image can be used to create distribution values, or a feature vector, to be used to aid in the prediction process of decoding to narrow the prediction possibilities. In some implementations, the distribution values can be multiplied by a random value to require the decoder to rely on both the embedding and the feature vector in decoding and predicting (e.g., to generalize the decoder model).

The encoded data produced from the augmented image data with mask and combined with the feature vector can be input into the decoder. The decoder can decode the data to create a replacement image. Stated differently, the decoder can predict replacement data, which replaces the unwanted data in an attempt to match the ground truth data.

Specifically, after the image is decoded, the replacement image can be evaluated against the ground truth image using any number and/or combination of different loss functions. Three example loss functions that can be used include: a L1 loss function, a VGG loss function, and an adversarial loss function. After the evaluation, a modification or update step can be performed to update the parameters (e.g., of the encoder and/or decoder models) based on the loss function (s). The training can be iteratively repeated over a number of ground truth and augmented image training examples.

Once training is completed, the system can be run to generate replacement data for portions of an input image identified as unwanted by a mask. In particular, at inference time, a new input image with some unwanted data can be provided to the trained encoder model along with a mask that identifies the location and/or size of the unwanted data within the input image. The encoder can produce encoded data (e.g., which may also be referred to as "an embedding") based on the input image and mask.

Further, in some implementations, a conditioning vector (e.g., which may in some instances be a zero vector) can be included with (e.g., concatenated to) the embedded data generated by the encoder from the input data and the mask. As the system was trained with randomized feature vectors, a well-trained system can produce reasonable results. The system may use the trained parameters to create replacement data in place of the unwanted data.

Thus, at inference time, image data with unwanted image data can be inputted into the encoder along with a mask that identifies the unwanted image data. The encoded image data can then be inputted into the decoder with a conditioning vector. The decoder can output a replacement image in which the unwanted image data has been removed and replaced with replacement data (e.g., which depicts a portion of the scene that was previously occluded by the unwanted image data).

A method for inpainting with machine learning which accurately replaces the unwanted data with predicted replacement data allows for the removal of unwanted objects and people from pictures or videos. The same need can be found in other forms of media including audio waveform data (e.g., it may be desired to remove unwanted noise such as clicks, hiss, or the like, or it may be desired to isolate a single speaker by removing audio data that corresponds to other speakers or background noise). The unwanted data can be replaced with predicted data based on properties in the remaining data. Thus, although the systems and methods are described herein with reference to visual image data such as scenes, they can also be applied to other types or modalities of data (e.g., audio data, audio data/sound images, text data, text images etc.) in which replacement data is predicted to replace unwanted data (e.g., as identified via masking). Further, image data can include two-dimensional image data (e.g., photographs) or three-dimensional image data (e.g., mesh models or point clouds such as, e.g., LiDAR point clouds). For example, for a point cloud, a mask may indicate which points in the point cloud are unwanted. More generally, for various other modalities, the mask may indicate which portion(s) of the data are unwanted.

As inpainting and data replacement can be non-deterministic, the prediction needed for the creation of replacement data can be difficult. Machine learning can be one method for training a system to more accurately predict the correct replacement data. The trained prediction system can then be utilized to create the most accurate replacement data. Training using ground truth data and augmented data can allow for the system to evaluate and modify the parameters of the system to more accurately predict what is being occluded by the unwanted data. Use of ground truth data for training means that the training process is not non-deterministic.

The process of removing unwanted image data from image data may be referred to as inpainting. Machine learning models can be implemented into a system or process in order to provide increasingly more precise and efficient outcomes for automated inpainting. For example, in some implementations, inpainting can be accomplished through the utilization of a conditional variational autoencoder.

In some implementations, the system or method may utilize a conditional variational autoencoder for dense prediction in tandem with a discrimination component, in which the discrimination component separates the entire image data into two areas, existing and missing. The conditional variational autoencoder may use ground truth information in addition to the embedded feature vector of a variational autoencoder. The conditional variational autoencoder may use the image pixels outside of the unwanted image data to aid in prediction.

In some implementations, ground truth image data may be utilized for machine-learning training. In some implementations, training includes: intaking of the augmented image data by an encoder with a mask that indicates the size and location of the unwanted image data, outputting embedded data, intaking the ground truth image with the mask by another encoder, outputting a feature vector, randomizing the feature vector, inputting the embedded data and the randomized feature vector into a decoder, outputting replacement image data, evaluating the replacement image data against the ground truth image, and modifying the parameters of the operation based on the evaluation of the replacement image data versus the ground truth image data.

In some implementations, ground truth data may be data that does not include unwanted data. Ground truth data can be an ideal outcome of replacement data created by the system. Ground truth data can be a useful data set for determining the accuracy of the inpainting method or system.

In some implementations, augmented data may include unwanted data. In some implementations, the unwanted data can be data that obscures the ground truth data. For example, unwanted data left after an image has been subjected to a denoising process, or a human being obscuring a landscape in a picture.

In some implementations, augmented data may be a created data set. The augmented data may be produced by addition of unwanted data into a set of ground truth data. For example, several pixels of a set of ground truth image data may be occluded by the addition of a color blotch or other object. The color blotch may be considered unwanted data, and therefore, the inpainting system may be used to remove and replace the color blotch or other object.

In some implementations, a mask may be included in the inpainting system or method. A mask may be an indicator of the size and location of the unwanted data. The mask may be used to separate what needs to be replaced and what data is part of the desired data set. In some implementations, an inverse mask may be created for discriminative training.

In some implementations, the mask can be manually created by a user. In some implementations, the mask can be automatically created. In some implementations, the automated creation of the mask may be done by a system trained to create masks with a machine-learning model (e.g., a segmentation model).

In some implementations, a machine-learning model may be utilized to train and provide rules for the inpainting system. One example of a machine-learning model that can be trained and implemented may be a conditional variational autoencoder. For example, the system may have an upper variational encoder pipeline and a lower encoder pipeline. For example, the upper pipeline may include an encoder for encoding augmented data and a mask to create embedded data, and the lower pipeline may include an encoder for encoding the ground truth data to create a feature vector. In some implementations, the upper and lower pipelines may converge. The embedded data with the guidance of the feature vector may produce replacement data, when inputted into a decoder.

In some implementations, the feature vector may include distribution values. The distribution values may be a standard deviation value and a mean value. In some implementations, the distribution values can be randomized to ensure the decoder does not rely solely on the feature vector for predicting replacement data.

In some implementations, the conditioning vector may be a zero vector. In some implementations, the zero vector may provide reasonable prediction data because of the training with assorted feature vectors.

In some implementations, the evaluation of the replacement data against the ground truth data may be quantified by a loss function. Loss functions may be used individually or in any combination. For example, an L1 loss function, a VGG loss function, and/or an adversarial loss function may be used in combination to evaluate the model's prediction. The evaluation may also be completed with any of the three loss functions individually. In some implementations, a KL divergence loss function can aid in evaluating the training. For example, a KL divergence loss function may have a second term trend to zero. The trending towards zero may indicate an improvement in the system, and that the system is becoming closer to being optimized.

In some implementations, the discriminator method or system involves two-levels: a semantic level and a texture level. The semantic level can be related to the understanding of the data as a whole. The texture level may be related to the finer portions of the predicted data including the sharpness of the replacement data.

In some implementations, the inpainting system and method may be applied to three-dimensional point cloud editing. One or more points in a point cloud may be unwanted data and may need to be removed or replaced. In some implementations, the inpainting system or method for three-dimensional point clouds may be trained with ground truth three-dimensional point clouds, augmented three-dimensional point clouds, and masks. The augmented three-dimensional point clouds may be a ground truth three-dimensional point cloud with an addition of unwanted data. The unwanted data may be out-of-place points, unwanted points, or some other form of occluding data. The mask may be an indicator of the location of the unwanted data. In some implementations, the inpainting system and method may be applied in speech recognition, to infill areas of a received speech segment that have a low audio quality. The infilled speech segment may then be provided as input to a speech recognition system. Improving the audio quality of the speech segment provided to the speech recognition system may lead to greater accuracy of the speech recognition process, and/or allow speech recognition to be used with low audio quality speech segments.

In some implementations, the inpainting system and method may be applied to colorize black and white photographs. For example, in some implementations, a set of black and white photographs may be colorized manually or with computer aid. For example, to train the colorization system, the set of manually colorized black and white photographs may be inputted into the inpainting system as ground truth data, and the original black and white photographs may be inputted in place of the augmented data. The colorization system may use this data sample to train. Once training is completed, the system may produce colorized images from old black and white photographs that have not been previously colorized.

In some implementations, the inpainting system may replace or may be used in tandem with a denoising variational autoencoder. For example, a denoising variational autoencoder may remove noise from the set of data, and the inpainting system may remove and replace the unwanted data left after the denoising process.

In some implementations, the inpainting system may be a web application. In some implementations, the system may be an offline desktop application. Moreover, the system can be a mobile application. In some implementations, the system may be an add-on or extension for another application. The system can be a built-in feature of a larger application. In another example, the system can be provided as a service (e.g., as a service layer and/or by a server computing device). In some implementations, the automated mask creation can be built-in to the same application as the inpainting system.

In some implementations, the conditional variational autoencoder may include two autoencoders. The lower encoder may only be utilized in training by generating a feature vector by encoding the ground truth image data. The feature vector may be penalized by the KL Divergence loss function to require the conditional variational autoencoder to not solely rely on the feature vector. The randomization of the feature vector may still provide useful information for the decoder prediction.

The upper encoder may encode augmented image data and a mask. The augmented image data may be ground truth image data occluded by an object or other unwanted image data. The encoded augmented image data and mask may be added to the feature vector from the lower encoder. The added data may then be decoded to generate replacement image data. The operations may be implemented as concatenation.

In some implementations, the inference process may include the conditional variational autoencoder with the upper encoder but does not include the lower encoder. The lower encoder may be replaced with a conditioning vector such as, for example, a zero vector. The zero vector may produce reasonable image data due to the randomized feature vector training.

In some implementations, the system or method may include large information from the upper encoder being the primary source for prediction data. In some implementations, the upper encoder and the decoder may have skip connections within the convolutional neural network.

In some implementations which use an adversarial loss during training, the discriminator model used to generate the adversarial loss may be separated into two levels, texture and semantic. The discriminator may have the two layers separated. The discriminator may aid in distinguishing real image data from replacement image data generated by the decoder. In some implementations, the input image resolution may be changed. For example, the input image resolution may be changed from 256 pixels by 256 pixels to 16 pixels by 16 pixels. The 16×16 image may be the receptive field to address the texture of the replacement area. The image may be isolated with the aid of a segmented image mask. The semantic component of the model may look at the image data as a whole. Therefore, the predicted replacement data may be aided by both texture and semantic components of the discriminator.

In some implementations, the discriminator model may include two texture-level networks and a semantic level network. The first texture-level network may process a portion of ground truth image data at the locations indicated by the mask and may output a first texture discriminator output. The second texture-level network may process a portion of predicted image data at the locations indicated by the mask and may output a second texture discriminator output. The semantic level network may include a shared network. In some implementations, the shared network may process the ground truth image data with the unwanted data removed therefrom to generate a semantic discriminator output. In some implementations, the semantic level network may utilize an inverse mask for the discriminator processing. The semantic level network may generate a discriminator output based on the first texture discriminator output, the second texture discriminator output, and the semantic discriminator output.

In some implementations, the inpainting problem may be addressed by using a variable encoder pipeline, a double encoding discriminative training, and/or human perceptual loss. The system or method may implement these features individually or in any combination. The variable encoding pipeline may include ground truth image data being used as input to train the inpainting model. The model may include a noise changing model to address potential issues with the magnitude of noise in the predicted replacement data. The double encoding discriminative training may first address the texture level of the isolated unwanted image data, then may address the semantic level data to discriminate the ground truth data and the predicted data in training. In some implementations, the inpainting model may further include a texture synthesis step to address any extremes generated by the prediction step.

The systems and methods of the present disclosure provide a number of technical effects and benefits. As one example, the inpainting machine learning system can aid in computing performance by refining parameters of the predictions completed for the creation of the replacement data. Thus, the performed inpainting can be higher quality (e.g., more accurate) than previous techniques, which represents an improvement in the performance of a computing system. Further, the proposed approaches may eliminate the need to create such a large spectrum of predictions to be evaluated, which is required by certain existing techniques. Eliminating the need to create a large number of different predictions can result in savings of computing resources such as processor usage, memory usage, and/or network bandwidth usage. The use of ground truth data also removes some confusion from the training and makes the training more efficient, thereby conserving computing resources. The trained system may reduce the amount of computing resources utilized versus previous systems.

As the implementation of machine learning also eliminates the need to manually edit every occurrence of unwanted data in an image, more efficiency may be added. The system may also eliminate the need for a coder to write a long drawn out code, run the code, refine the code, and continually supervise performance.

Further, the system and method described herein may be used in any process in which an image is used as an input to a system, to provide higher quality input images to the system. Non-limiting examples of possible application include: medical images, such as X-ray images or scan image of a patient; monitoring the condition of an item of machinery, where images of the item of machinery are acquired regularly, and are used to determine when a component is likely to require repair or replacement; and an autonomous vehicle that makes decisions on its course and speed based on images that it acquires of its surrounding.

With reference now to the Figures, example embodiments of the present disclosure will be discussed in further detail.

Example Devices and Systems

FIG. 1A depicts a block diagram of an example computing system 100 that performs inpainting according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more transitory or non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more inpainting models 120. For example, the inpainting models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example inpainting models 120 are discussed with reference to FIGS. 2 & 3.

In some implementations, the one or more inpainting models 120 can be received from the server computing system 130 over network 180, stored in the user computing device memory 114, and then used or otherwise implemented by the one or more processors 112. In some implementations, the user computing device 102 can implement multiple parallel instances of a single inpainting model 120 (e.g., to perform parallel generation of predicted replacement data across multiple instances of unwanted data in a set of data).

More particularly, the inpainting model may have a training module with a set of training data to train the parameters of the model to optimize the generation of predicted data. The training module may rely on ground truth data to add efficiency and precision to the training module. Training may include the creation of augmented data from ground truth data by the addition of unwanted data to ground truth data. Masks may also be used in training to provide a marker for the size and location of the unwanted data.

The inpainting model may take the machine-learned data from the training module to aid the inference module. The inference module may intake user data in which the user data includes unwanted data. The inference module may then generate replacement data based on the user data and a mask in which the replacement data includes predicted data in place of the unwanted data. The server may contain the machine-learned data to aid in the generation of the predicted data.

Additionally or alternatively, one or more inpainting models 140 can be included in or otherwise stored and implemented by the server computing system 130 that communicates with the user computing device 102 according to a client-server relationship. For example, the inpainting models 140 can be implemented by the server computing system 140 as a portion of a web service (e.g., an image editing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more transitory or non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned inpainting models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 & 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more transitory or non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the inpainting models 120 and/or 140 based on a set of training data 162. The training data 162 can include, for example, a set of ground truth data, a set of augmented data, and a set of masks to indicate the size and location of the addition of unwanted data to the respective ground truth data to create the respective augmented data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
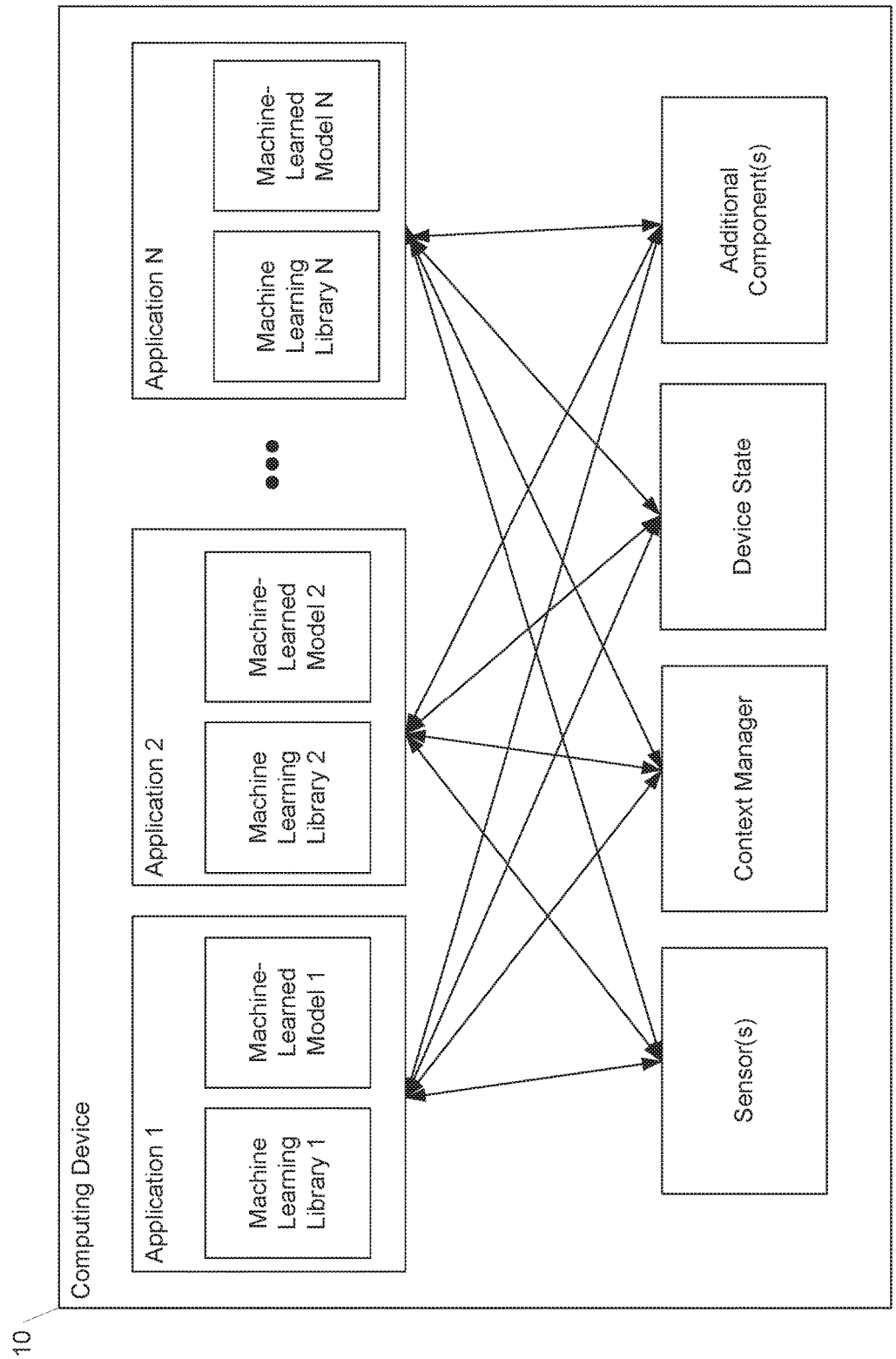
FIG. 1B depicts a block diagram of an example computing device to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
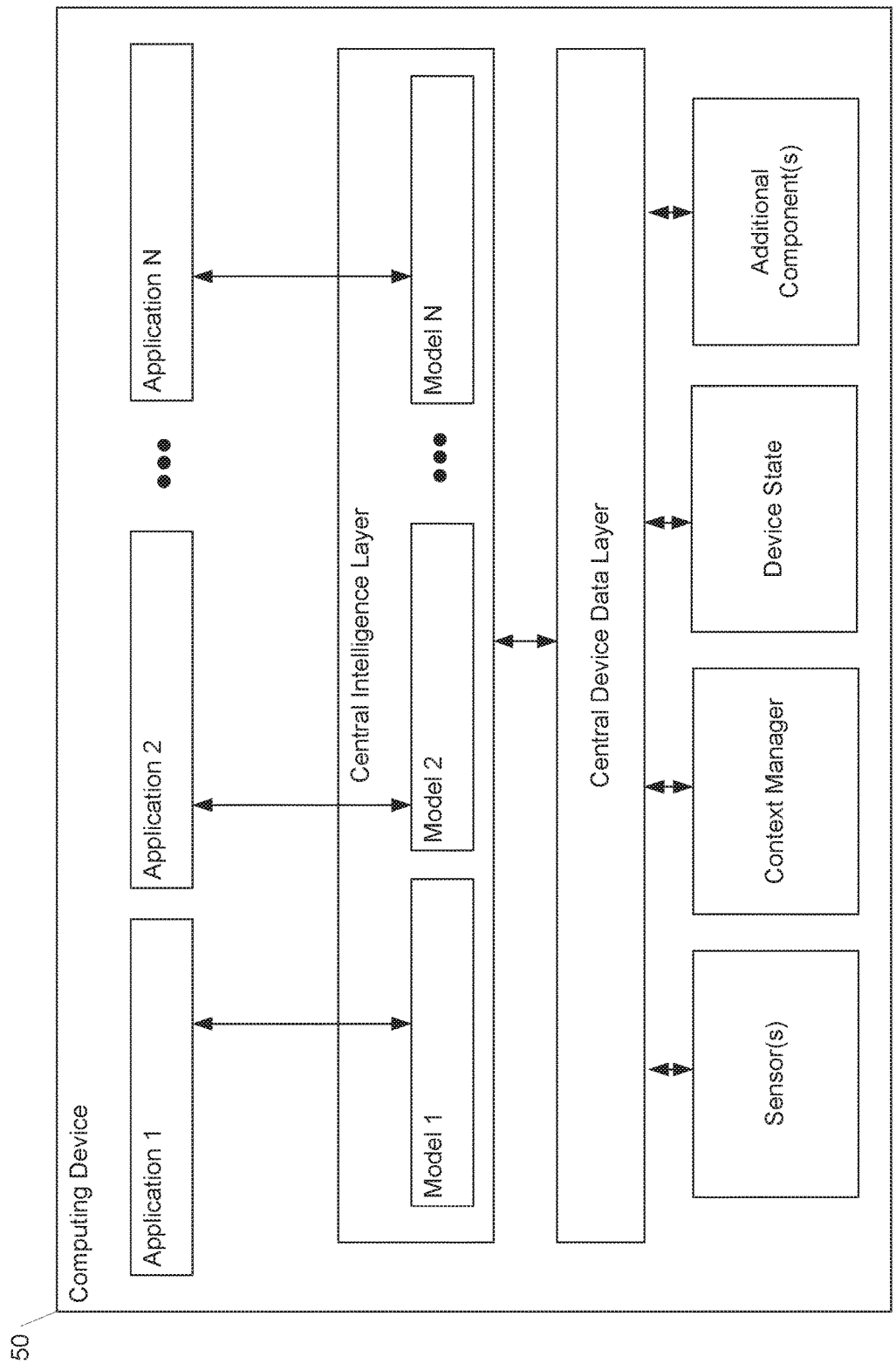
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
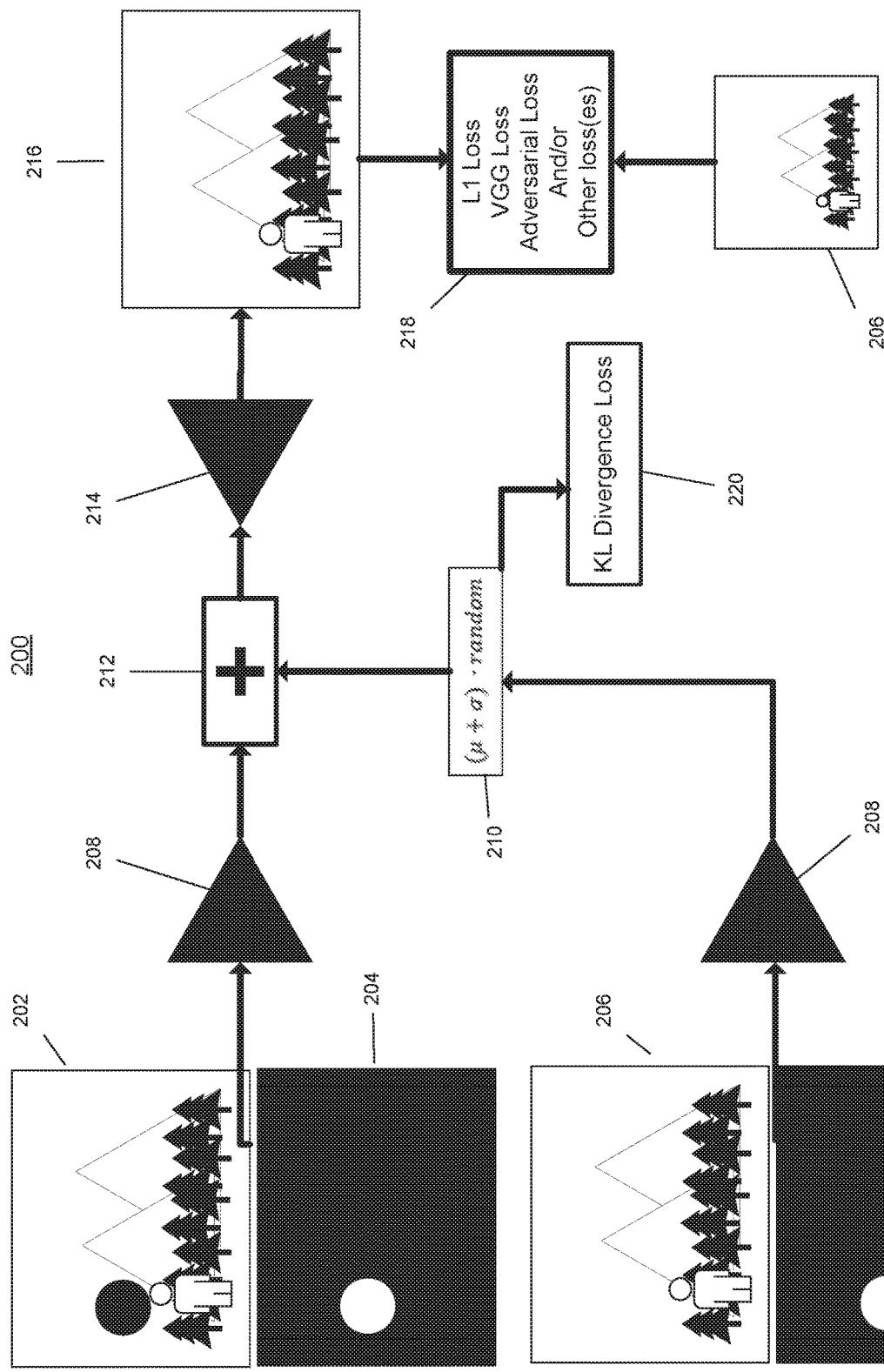
FIG. 2 depicts a block diagram of an example training process to train a machine-learned model according to example embodiments of the present disclosure.

FIG. 2 depicts a block diagram of an example technique to train an example inpainting model 200 according to example embodiments of the present disclosure. In some implementations, the inpainting model 200 is trained to receive a set of input data 202 descriptive of augmented image data and, as a result of receipt of the input data 202, provide output data 216 that can be replacement image data. Thus, in some implementations, the inpainting model 200 can be or include a conditional variational autoencoder model trained to replace the unwanted data with the predicted replacement data.

In some implementations, the training process for the inpainting model may have an upper pipeline and a lower pipeline. The upper pipeline may receive as input augmented image data 202 and a mask 204. The augmented image data 202 can include unwanted data (e.g., that has been added to a ground truth image 206. In the illustrated example, the unwanted data is illustrated using a circle in the augmented image data 202. The mask 204 indicates the location of the unwanted data within the augmented image data 202. The upper pipeline can include an encoder 208 to encode the augmented image data 202 and the mask 204 to create embedded image data.

The lower pipeline may include ground truth image data 206, the mask 204, and an encoder 208 to encode the ground truth image data 206 and the mask 204 to create a feature vector that may be randomized 210.

Figure 6:
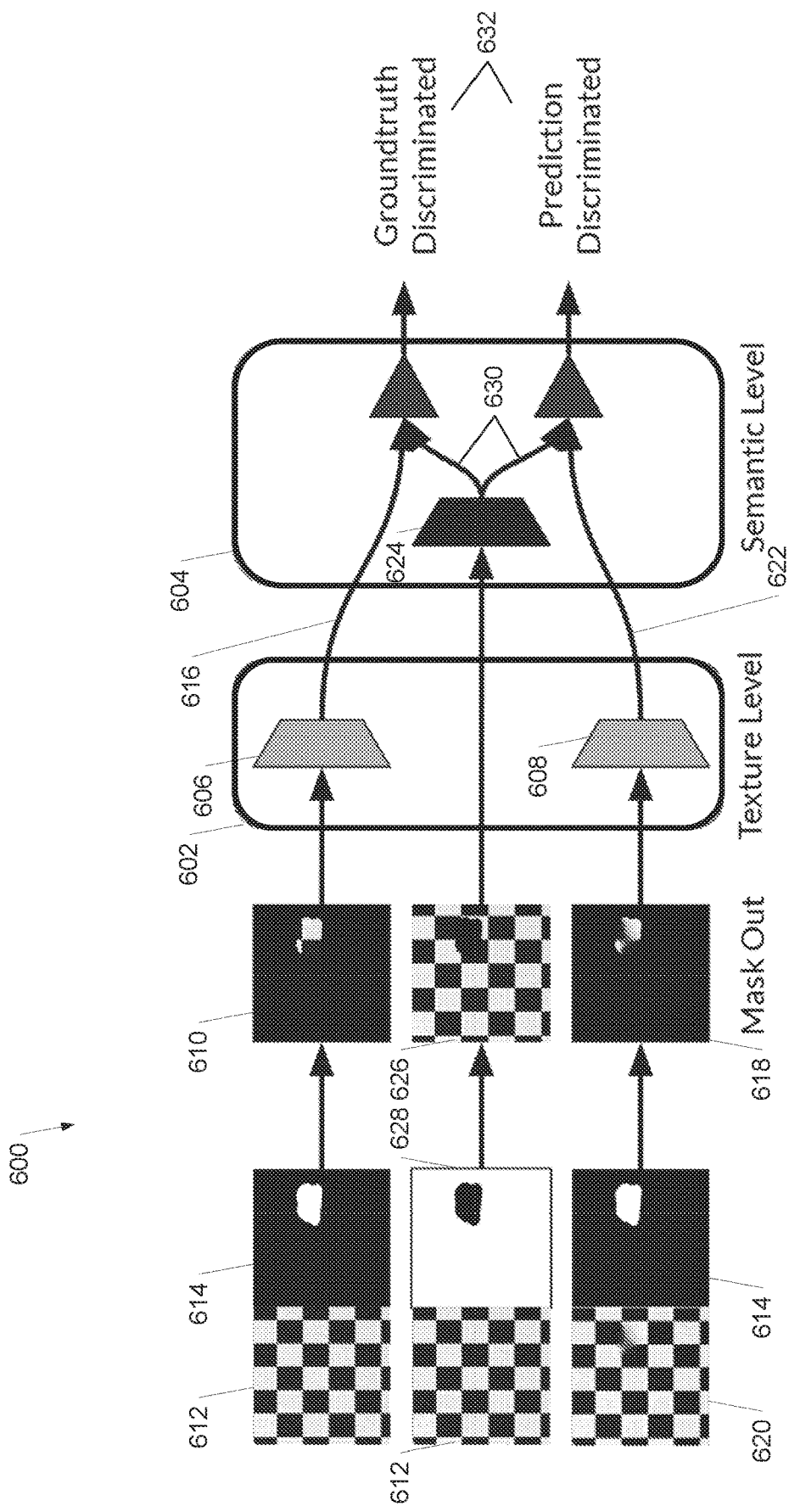
FIG. 6 depicts a block diagram of an example double encoding discriminative training approach according to example embodiments of the present disclosure.

In some implementations, the embedded image data and the randomized feature vector 210 may be compiled 212 (e.g., concatenated). The compiled data may be decoded by a decoder 214 to create predicted replacement image data 216. The predicted replacement image data 216 may then be evaluated against the ground truth image data 206 based on a variety of loss functions 218, individually or in combination. Three example loss functions 218 that can be used include: a L1 loss function, a VGG loss function, and/or an adversarial loss function. One example discriminator model that can be used to generate the adversarial loss is shown in FIG. 6.

In some implementations, in addition to the loss functions described above, the randomized feature vector 210 may be evaluated with a KL Divergence loss function 220. For example, the KL Divergence loss function 220 may take the form:

$$\sum_{i=1}^{n} \sigma_i^2 + \mu_i^2 - \log(\sigma_i) - 1$$

In some implementations, the KL loss 220 may be equivalent to the sum of all the KL divergences between the component $X_i \sim N(\mu_i, \sigma_i^2)$ in X, and the standard normal. In some implementations, the KL loss 220 can be minimized when $\mu_i=0$, $\sigma_i=1$.

Modifications can be made to one or more parameters of the model 200 based on the evaluation data (e.g., based on the loss functions 218 and/or 220. For example, the loss function(s) can be backpropagated through the models and the parameters of the models can be changed according to a gradient of the loss function(s). In some implementations, this process may be done iteratively to train the model over a number of different training examples.

Figure 3:
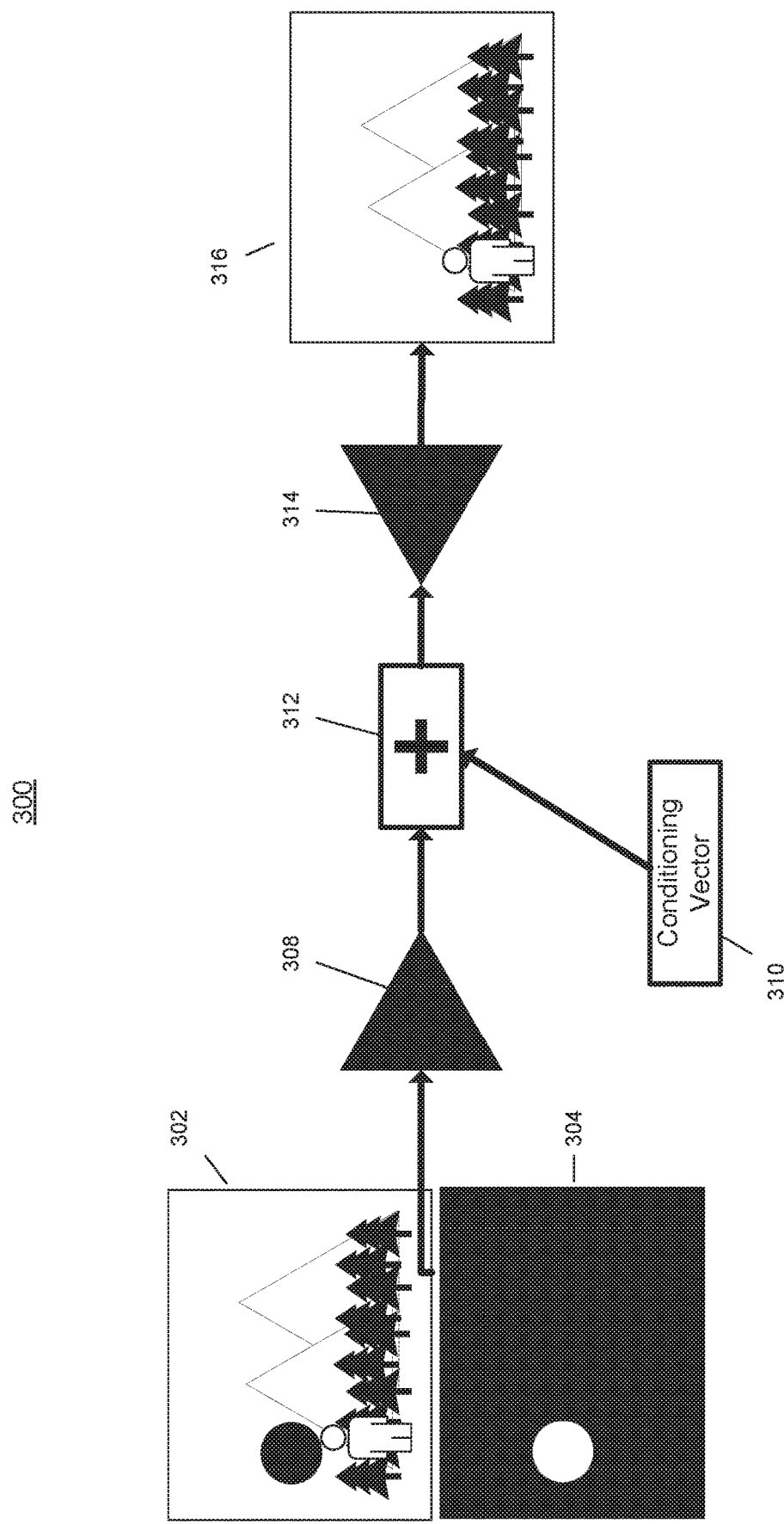
FIG. 3 depicts a block diagram of an example inference process to infer replacement data using a machine-learned model according to example embodiments of the present disclosure.

FIG. 3 depicts a block diagram of an example inpainting model 300 performing inference according to example embodiments of the present disclosure. The inpainting model 300 is similar to the inpainting model 200 of FIG. 2 except that inpainting model 300 relates to the inference process of the model. The inference process may occur after the system has gone through a round of training using a ground truth training technique.

The inference process may begin with a set of data 302 including unwanted data and a mask 304 and the model 300 may output a set of replacement data 316 in which the unwanted data is replaced with predicted data. In some implementations, the inference process may replace the lower pipeline of the training process with a conditioning vector 310. The conditioning vector 310 may be a zero vector.

In some implementations, the inference process may involve a set of data 302 and a mask 304 being encoded by an encoder 306 to create embedded data. The set of data 302 may include unwanted data and the mask 304 may indicate the size and location of the unwanted data. Moreover, a conditioning vector 310 and the embedded data may be compiled 312 (e.g., concatenated). The compiled data 312 may be decoded by a decoder 314. The decoding by the decoder 314 can create a set of replacement data 316 based on predictions by the system.

FIG. 6 depicts a block diagram of an example double encoding discriminative training approach according to example embodiments of the present disclosure. More particularly, in some implementations, evaluating the loss of an inpainting model (e.g., model 200 of FIG. 2) can include evaluating an adversarial loss generated based on a discriminator output generated by a discriminator model based on the predicted image data and the ground truth image data. One example discriminatory model 600 is shown in FIG. 6.

As illustrated in FIG. 6, the discriminator model 600 includes a textural level 602 and a semantic level 604. The texture level 602 includes a first texture-level network 606 that processes the portion 610 of the ground truth image data 612 at the one or more locations identified by the mask 614 to generate a first texture discriminator output 616. The texture level 602 also includes a second texture-level network 608 that processes the portion 618 of the predicted image data 620 at the one or more locations identified by the mask 614 to generate a second texture discriminator output 622.

The semantic level 604 includes a shared network 624 that processes the ground truth image data 612 with the unwanted data removed therefrom (e.g., shown at 626 and generated based on an inverse mask 628) to generate a semantic discriminator output 630. The discriminator model 600 generates a discriminator output 632 based on the first texture discriminator output 616, the second texture discriminator output 622, and the semantic discriminator output 630.

The proposed discriminator model 600 shown in FIG. 6 leverages that the task of inpainting can be separated into two levels, texture and semantic. The discriminator 600 has those two separated layers at 602 and 604.

In some implementations, the first and second texture-level networks 606 and 608 can share the same weights. Similarly, the portions shown as triangles in level 604 can also share weights with each other (these can be referred to as semantic-level networks).

In some implementations, the first and second texture-level networks 606 and 608 can change the input image resolution from a first resolution (e.g., 256×256) to a second, smaller resolution (e.g., 16×16), which means the size of pixels (e.g., 16×16) is the receptive field.

As designed, the texture level 602 can look at the texture more than semantic, because most of the image area is masked out, there is less information about semantics already. On the other hand, the shared network 624 can look at texture information also, but should try to give semantic information to pass to the semantic-level networks. The semantic-level networks can receive the outputs 616, 622, and 630 and make a final discriminative judgement to provide a discriminator output 632, real or generated. One important portion of this architecture is the shared network 624, which can focus on the semantic meaning because of its surrounding connections. The final discriminator output 632 can be used (e.g., via backpropagation) to train the inpainting model(s).

Example Methods

Figure 4:
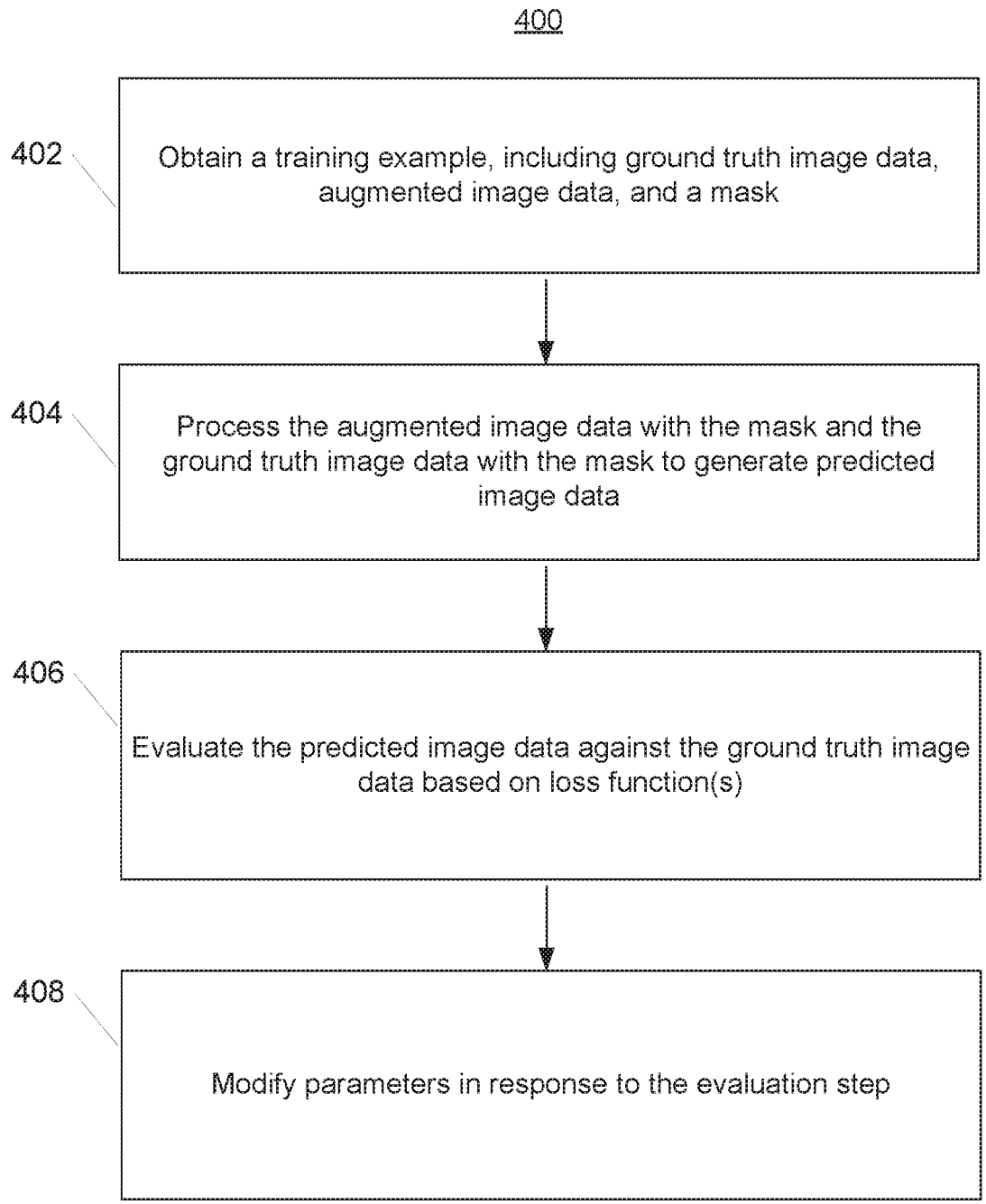
FIG. 4 depicts a flow chart of an example method to train a machine-learned model according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system may include obtaining a training example. The training example may be obtained through the use of one or more computing devices. The training example may include ground truth image data, augmented image data, and a mask. The augmented image data may be derived from the addition of unwanted image data to the ground truth image data, and the mask may indicate the location and size of the unwanted image data within the augmented image data.

At 404, the computing system may include processing the augmented image data, the ground truth image data, and the mask. In some implementations, the processing may be completed by one or more computing devices. The augmented image data and the mask may be processed by a first encoder model of a conditional variational autoencoder to generate an embedding. The ground truth image data and the mask may be processed with a second encoder model of the conditional variational autoencoder to generate a feature vector. The feature vector may include distribution values, and the distribution values may be a mean value and a standard deviation value. The feature vector may be randomized after generation. The embedding and the randomized feature vector may be compiled and processed with a decoder model. The decoder model of the conditional variational autoencoder may generate predicted image data. The predicted image data may include replacement image data for the area indicated by the mask. The unwanted data may be replaced by the replacement image data.

At 406, the computing system may include evaluating the generated predicted image data against the ground truth image data. The evaluation may be completed by one or more computing devices. The evaluation may be based on one or more loss functions. An L1 loss function, a VGG loss function, and an adversarial loss function may be used individually or in any combination.

At 408, the computing system may include modifying one or more parameters. The modification may be completed by one or more computing devices. The modification may be made in response to the evaluation data. The modification may be made to the parameters of a conditional variational autoencoder.

Figure 5:
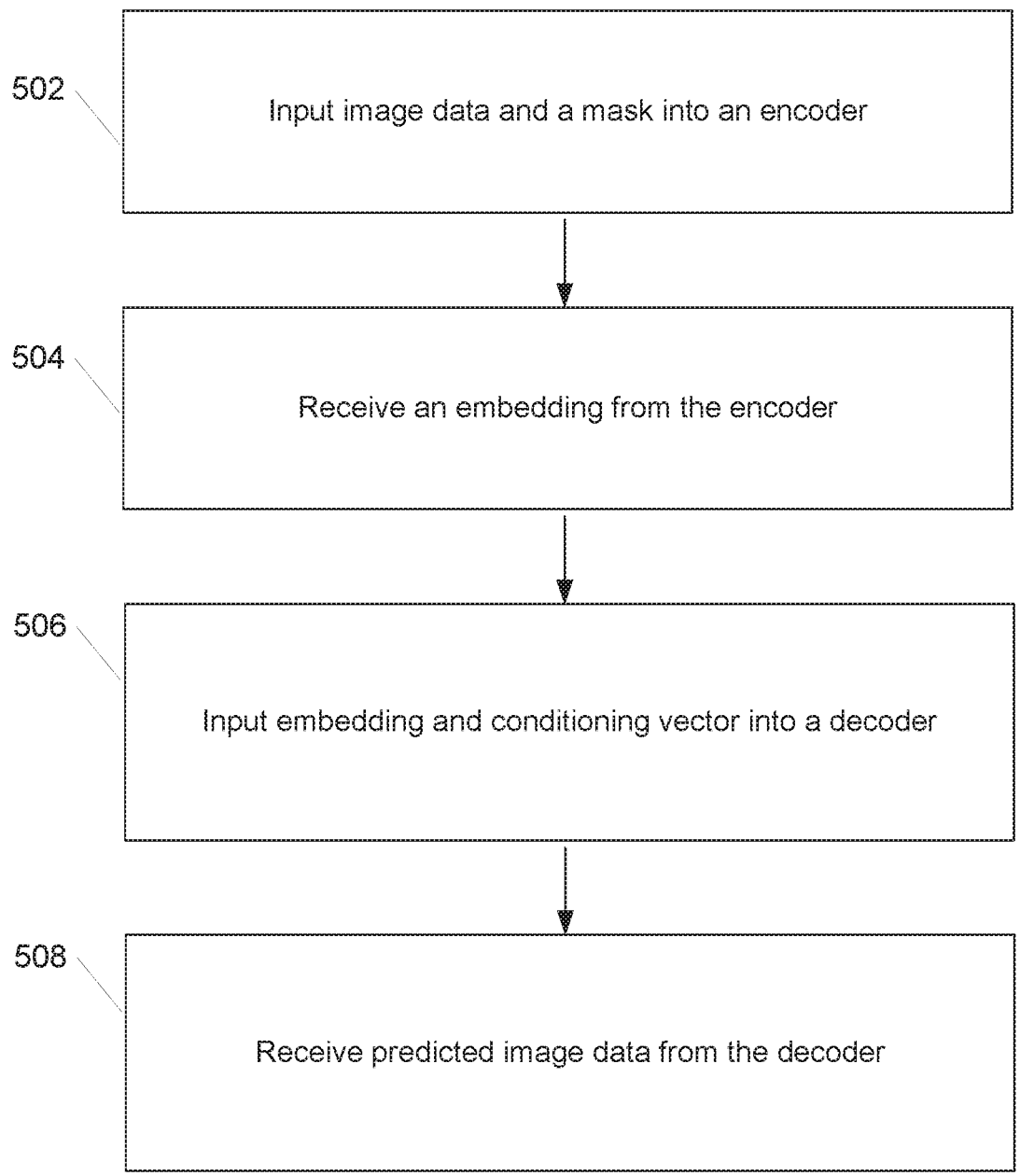
FIG. 5 depicts a flow chart of an example method to infer replacement data using a machine-learned model according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system may include inputting image data and a mask into an encoder. In some implementations, the encoder may be an encoder for a conditional variational autoencoder. The image data may include unwanted image data, and the mask may provide a location and size of the unwanted image data. The unwanted image data may be a human person in the foreground of a landscape photograph, a human being in the background of a family photograph, or another occluding object.

At 504, the computing system may include receiving an embedding from the encoder. The embedding may include the encoded image data. The embedding may be complemented by a conditioning vector. The conditioning vector may be a zero vector.

At 506, the computing system may include inputting the embedding and a conditioning vector into a decoder. In some implementations, the decoder may be a decoder for a conditional variational autoencoder.

At 508, the computing system may include receiving predicted image data from the decoder. The predicted image data may include replacement image data. The replacement image data may replace the unwanted image data. The replacement image data may be the exact size and in the exact location of the unwanted data as indicated by the mask.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training a conditional variational autoencoder to perform image processing, the method comprising:
    obtaining, by one or more computing devices, a training example comprising ground truth image data, augmented image data derived from an addition of unwanted image data to the ground truth image data, and a mask that indicates one or more locations of the unwanted image data within the augmented image data;
    processing, by the one or more computing devices, the augmented image data and the mask with a first encoder model of the conditional variational autoencoder to generate an embedding for the image data;
    processing, by the one or more computing devices, the ground truth image data and the mask with a second encoder model to generate one or more distribution values;
    processing, by the one or more computing devices, the embedding and the one or more distribution values with a decoder model of the conditional variational autoencoder to generate predicted image data that comprises replacement image data at the one or more locations indicated by the mask, wherein the replacement image data replaces the unwanted image data;
    evaluating, by the one or more computing devices, one or more loss functions based on a comparison of the predicted image data with the ground truth image data wherein evaluating the one or more loss functions comprises evaluating an adversarial loss generated based on a discriminator output generated by a discriminator model based on the predicted image data and the ground truth image data; wherein the discriminator model comprises:
        a first texture-level network that processes a portion of the ground truth image data at the one or more locations identified by the mask to generate a first texture discriminator output;
        a second texture-level network that processes a portion of the predicted image data at the one or more locations identified by the mask to generate a second texture discriminator output; and
        a semantic level network that comprises a shared network that processes the ground truth image data with the unwanted data removed therefrom to generate a semantic discriminator output;
        wherein the semantic level network generates the discriminator output based on the first texture discriminator output, the second texture discriminator output, and the semantic discriminator output; and
    modifying, by the one or more computing devices, one or more parameter values of the conditional variational autoencoder based at least in part on the one or more loss functions.

2. The computer-implemented method of claim 1, wherein the ground truth image data comprises a two-dimensional photograph.

3. The computer-implemented method of claim 1, wherein the ground truth image data comprises a ground truth three-dimensional point cloud, the augmented image data comprises one or more unwanted points added to the ground truth three-dimensional point cloud, and the mask identifies the one or more unwanted points.

4. The computer-implemented method of claim 1, wherein evaluating the one or more loss functions comprises evaluating a L1 loss between the predicted image data and the ground truth image data.

5. The computer-implemented method of claim 1, wherein the distribution values comprise a mean value and a standard deviation value.

6. The computer-implemented method of claim 5, wherein the distribution values are penalized by a KL divergence loss function.

7. The computer-implemented method of claim 1, further comprising:
    multiplying the distribution values by a random value to generate modified distribution values, wherein the discriminator model processes the modified distribution values to generate the predicted image data.

8. The computer-implemented method of claim 1, wherein obtaining the augmented image data comprises:
identifying a set of unwanted data;
determining a location for the unwanted data to occlude the ground truth data;
replacing a portion of the ground truth data at the location with the set of unwanted data.

9. The computer-implemented method of claim 1, wherein:
the ground truth image data depicts a scene;
the unwanted image data comprises an occluding object; and
the replacement image data depicts one or more portions of the scene occluded by the occluded object.

10. The computer-implemented method of claim 9 wherein the occluding object comprises artefacts from a denoising process applied to the augmented image data.

11. A computing system, comprising:
one or more processors;
one or more non-transitory computer-readable storage media that collectively store:
a machine-learned conditional variational autoencoder model trained on a loss function based on a discriminator output generated by a discriminator model based on predicted image data and ground truth image data, comprising:
an encoder, wherein the encoder is configured to encode image data;
a decoder, wherein the decoder is configured to decode encoded image data;
wherein the discriminator model comprises:
a first texture-level network that processes a portion of the ground truth image data at one or more locations identified by a mask to generate a first texture discriminator output;
a second texture-level network that processes a portion of the predicted image data at one or more locations identified by a mask to generate a second texture discriminator output; and
a semantic level network that comprises a shared network that processes the ground truth image data with unwanted data removed therefrom to generate a semantic discriminator output;
wherein the semantic level network generates the discriminator output based on the first texture discriminator output, the second texture discriminator output, and the semantic discriminator output; and
instructions that, when executed by the one or more processors, cause the computing system to perform operations, the operations comprising:
inputting image data and a mask into the encoder, wherein the image data comprises unwanted image data, and wherein the mask indicates a location and size of the unwanted image data;
receiving an embedding from the encoder, wherein the embedding comprises the encoded image data;
inputting the embedding and a conditioning vector into the decoder; and
receiving predicted image data as an output of the decoder, wherein the predicted image data replaces the unwanted image data with predicted replacement data based at least in part on the image data and the conditioning vector.

12. The computing system of claim 11, wherein the conditioning vector comprises a zero vector that replaces a set of randomized feature vectors used during training of the machine-learned conditional variational autoencoder model.

13. The computing system of claim 11, wherein the machine-learned conditional variational autoencoder model has been trained based on a loss function that compares ground truth training image data against predicted training image data generated by the machine-learned conditional variational autoencoder model based on augmented training image data, the augmented training image data created through insertion of unwanted image data into the ground truth training image data.

14. The computing system of claim 11, wherein the input image data comprises a two-dimensional photograph.

15. The computing system of claim 11, wherein the input image data comprises a three-dimensional point cloud.

16. The computing system of claim 11, wherein:
the unwanted image data comprises an occluding object; and
the predicted replacement image data depicts one or more portions of the scene occluded by the occluded object.

17. One or more non-transitory computer-readable media that collectively store instructions that, when executed by one or more computing devices, cause the one or more computing devices to perform operations, the operations comprising:
obtaining, by one or more computing devices, a training example comprising ground truth data, augmented data derived from an addition of unwanted data to the ground truth data, and a mask that indicates one or more locations of the unwanted data within the augmented data;
processing, by the one or more computing devices, the augmented data and the mask with a first encoder model of the conditional variational autoencoder to generate an embedding for the data;
processing, by the one or more computing devices, the ground truth data and the mask with a second encoder model to generate one or more distribution values;
processing, by the one or more computing devices, the embedding and the one or more distribution values with a decoder model of the conditional variational autoencoder to generate predicted data that comprises replacement data at the one or more locations indicated by the mask, wherein the replacement data replaces the unwanted data;
evaluating, by the one or more computing devices, one or more loss functions based on a comparison of the predicted image data with the ground truth data wherein evaluating the one or more loss functions comprises evaluating an adversarial loss generated based on a discriminator output generated by a discriminator model based on the predicted image data and the ground truth image data; wherein the discriminator model comprises:
a first texture-level network that processes a portion of the ground truth image data at the one or more locations identified by the mask to generate a first texture discriminator output;
a second texture-level network that processes a portion of the predicted image data at the one or more locations identified by the mask to generate a second texture discriminator output; and
a semantic level network that comprises a shared network that processes the ground truth image data with the unwanted data removed therefrom to generate a semantic discriminator output;

wherein the semantic level network generates the discriminator output based on the first texture discriminator output, the second texture discriminator output, and the semantic discriminator output; and modifying, by the one or more computing devices, one or more parameter values of the conditional variational autoencoder based at least in part on the one or more loss functions.

18. The one or more non-transitory computer-readable media of claim 17, wherein the ground truth data comprises ground truth audio waveform data, the augmented data comprises augmented audio waveform data, the replacement data comprises replacement audio waveform data, and the unwanted data comprises unwanted audio waveform data.

\* \* \* \* \*